(12) United States Patent
Najjar

(10) Patent No.: US 6,721,801 B2
(45) Date of Patent: Apr. 13, 2004

(54) INCREASED NETWORK AVAILABILITY FOR COMPUTERS USING REDUNDANCY

(75) Inventor: Joseph N. Najjar, Canton, MA (US)

(73) Assignee: Brooks Automation, Chelmsford, MA (US)

(*) Notice: Subject to any disclaimer, the term of this patent is extended or adjusted under 35 U.S.C. 154(b) by 387 days.

(21) Appl. No.: 09/749,499

(22) Filed: Dec. 26, 2000

(65) Prior Publication Data

US 2002/0129163 A1 Sep. 12, 2002

(51) Int. Cl.[7] .............................................. G06F 15/173
(52) U.S. Cl. ...................... 709/242; 709/238; 709/239; 709/240; 709/241; 709/245; 709/250
(58) Field of Search ............................... 709/239, 238, 709/240, 241, 242, 245, 250

(56) References Cited

U.S. PATENT DOCUMENTS

| 5,237,571 A | | 8/1993 | Cotton et al. ............. 370/110.1 |
|---|---|---|---|
| 5,526,489 A | | 6/1996 | Nilakantan et al. ..... 395/200.02 |
| 5,774,640 A | * | 6/1998 | Kurio ............................. 714/4 |
| 5,949,753 A | * | 9/1999 | Alexander et al. .......... 370/216 |
| 6,041,063 A | * | 3/2000 | Povlsen et al. ........ 370/395.53 |
| 6,061,739 A | | 5/2000 | Reed et al. .................. 709/245 |
| 6,202,169 B1 | * | 3/2001 | Razzaghe-Ashrafi et al. .. 714/6 |
| 6,392,990 B1 | * | 5/2002 | Tosey et al. ................ 370/218 |
| 6,512,774 B1 | * | 1/2003 | Vepa et al. ................. 370/401 |
| 6,519,651 B1 | * | 2/2003 | Dillon ........................ 709/250 |

FOREIGN PATENT DOCUMENTS

WO   PCT/US01/4728   12/2001

* cited by examiner

Primary Examiner—Saleh Najjar
(74) Attorney, Agent, or Firm—Perman & Green, LLP; Richard Pickreign

(57) ABSTRACT

A method for providing data paths between a sending computer and a receiving computer. The method is comprised of steps of periodically receiving broadcasted data through a first subnet data path and through a second subnet data path, and reception of the broadcasted data on either of the subnets indicates status of the respective subnet. The method continues on to change local data routing tables in the sending computer and the receiving computer based upon the status of at least one of the subnets, providing high reliability in a peer-to-peer environment.

23 Claims, 4 Drawing Sheets

INCREASED NETWORK AVAILABILITY FOR COMPUTERS USING REDUNDANCY

MICROFICHE APPENDIX

In Accordance with 37 C.F.R sec. 1.77(6) and 37 C.F.R. sec 196(c) reference is made to a microfiche appendix. The appendix contains 1 microfiche containing 28 total frames.

BACKGROUND OF THE INVENTION

1. Field of the Invention

The present invention relates to data communications and, more particularly, to computer networks.

2. Prior Art

Reference is now made to FIG. 1. In general, the movement of data from one computer application to a network is accomplished through a collection of data protocols typically depicted as layers or a stack 70. FIG. 1 illustrates data movement through the Transmission Control Protocol/Internet Protocol (TCP/IP) suite of protocols from an application to a network. As shown, data from the application layer 50 is first passed to a transport layer consisting of several protocols used for various purposes. The TCP portion 62 of the transport layer organizes data into packets and provides reliable packet delivery across a network through the IP layer 51. (TCP is said to be "connection oriented" in that TCP checks to see if the data arrived at its destination and will re-send if it did not.) UDP 61 or User Datagram Protocol also moves data to the IP layer 51, but unlike TCP 62 does not guarantee reliable packet delivery. Lastly, the Internet Control Message Protocol or ICMP 66 is used to report network errors and if a computer is available on the network.

From the transport layer 60–62 the data is passed to the Internet Protocol (IP) Layer 51 responsible for delivering TCP 62 and UDP 61 packets across a network. IP 51 transfers the data packets to the data link and physical layer 52, i.e., network interface card (NIC). For an application to receive data the process is simply reversed.

Before a computer application can send data it must know the physical address of the computer it wants to send data to, i.e., what is the physical or hardware address corresponding to the IP address of the receiving computer? In general, the physical address is found by the computer in the computer's Address Resolution Protocol (ARP) tables. The address information is automatically stored by the TCP/IP ARP utility. The ARP utility learns of the physical address of a receiving computer's network interface card (NIC) by way of an ARP request. The request is generated when a computer application has requested that data be sent to a particular IP address but the IP address does not have a corresponding physical address in the ARP table. The ARP utility then sends a broadcast message on the data link requesting that a computer with a specific IP address return its physical address. The problem is if the computer is not available due to a failed data link, i.e., the computer is unavailable on the network, then the data is not transmitted and an error message would be generated.

In some instances a router may be used to route the data around a failed network depending on where the failure occurs. If the failure of the network is on the transmission side of the router then the router may be able to reroute the data if there are alternate networks available. However, a router falls short of a solution in that if the network failure occurs on the reception side of the router, i.e., the router never sees the data, then the router would not know that it has failed to receive data. Again, the data would not be transmitted and an error message would be generated. In general, a router is an independent agent, which acts as an intermediary through which data messages may pass.

If the computer is available it will return its physical address to the requesting computer. Once returned the address is loaded into the ARP table for current and future use. In addition, every other computer on the network will also see the address information and store the data on its own ARP table. This process of gathering physical addresses is well known and described in prior art.

It is a first object and advantage of this invention to provide improved network availability that embodies two parallel network interface cards per computer on a first subnet and a second subnet, where each subnet has the same subnet mask, and a method for rerouting data to the second subnet if the first subnet fails or otherwise becomes unavailable.

SUMMARY OF THE INVENTION

In accordance with one method of the present invention, a method for providing alternate data paths between a sending computer and a receiving computer is provided. The method comprises the steps of periodically receiving broadcasted data through a first subnet data link and through a second subnet data link. Reception of the broadcasted data on the subnets is used to indicate status of the respective subnets. A failure to receive the broadcasted data forces a change in the local routing tables in the sending computer and the receiving computer.

In accordance with another method of the present invention, a method is provided for providing alternate data links between computers. The method comprises the steps of sending data from a first computer on a first data link and on a second data link, and subsequently receiving the data at a second computer on the first data link and the second data link, or, in the alternative, detecting an inactive first data link or an inactive second data link. If an inactive data link is detected then the routing tables in the first computer and the second computer are reconfigured to redirect the data to the active link.

In accordance with one embodiment of the present invention, a system for providing data links between computers is provided. The system comprises a sending computer with a data routing table and two network interface cards (NICs). The system further includes a receiving computer also having a data routing table and two NICs. In addition, each of the NICs have the same network subnet mask and are connected to each other. For example, the first NIC in the sending computer is connected to the first NIC in the receiving computer thus comprising a first data link. A similar connection is made for the other two NICs comprising the second data link. Lastly, the system provides means for detecting a failure on the first data link and means for switching from the first data link to the second data link upon detection of the failure of the first data link and means for restoring the first data link when the failed link has been restored.

A program storage device readable by a machine, tangibly embodying a program of instructions executable by the machine to perform method steps for providing alternate sending data paths between a first and second computer is provided. The first and second computer comprises a peer-to-peer environment and the alternate sending data paths have a first and second data path. The method comprises the steps of sending a first data package from the first computer on the first data path, sending a second data package from the first computer on the second data path, receiving the first data at the second computer on the first data path, and receiving the second data at the second computer on the second data path. The method continues to detect an inactive first data path or an inactive second data path and reconfigures routing tables in the first computer and the second computer when an inactive data path is detected.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 3:
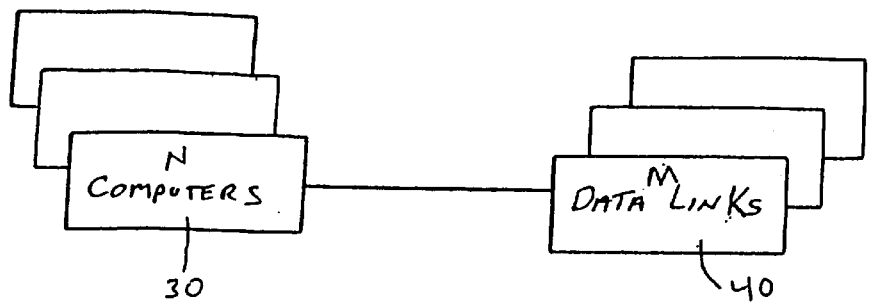
FIG. 3 is a block diagram of one embodiment of the invention showing multiple computers and multiple links.
Figure 3A:
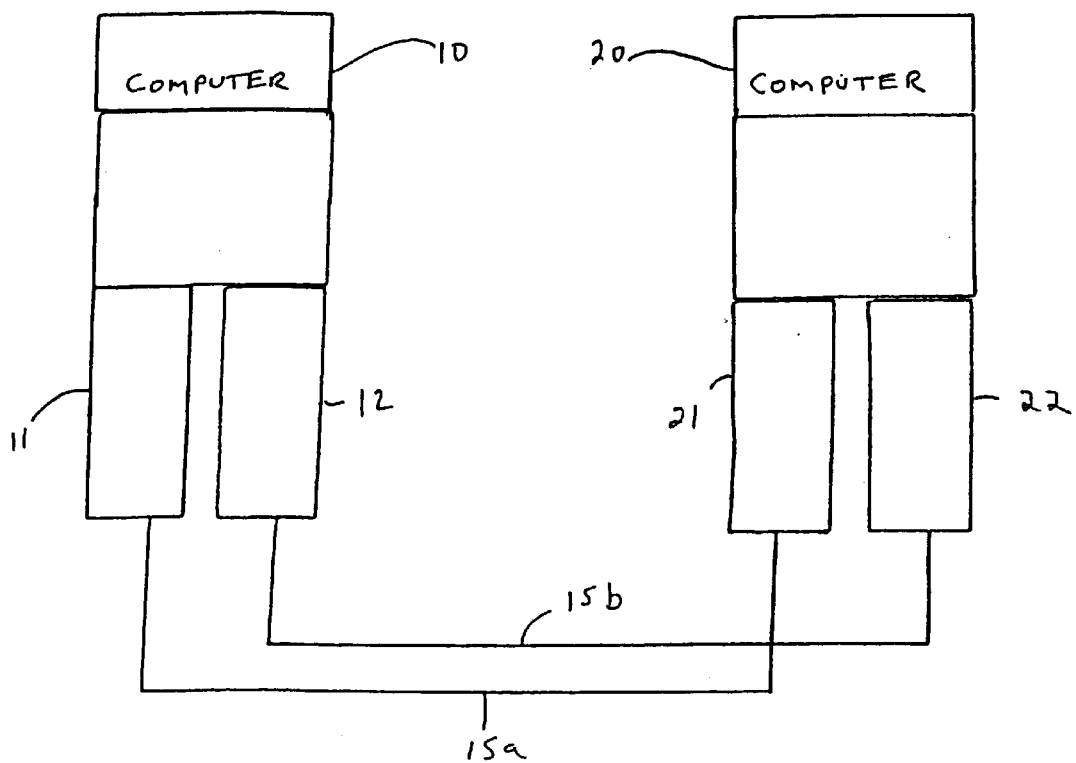
FIG. 3A is a block diagram showing two parallel network interface cards per computer, with corresponding links between computers.

Referring to FIG. 3A, there is shown a block diagram incorporating features of the present invention. Although the present invention will be described with reference to the single embodiment shown in the drawings, it should be understood that the present invention can be embodied in many alternate forms of embodiments as shown in FIG. 3.

The invention is implemented as a Windows NT service if a custom internet protocol stack is not available. The availability of a custom protocol stack would allow the invention to span multiple networks and would not be limited by the Windows NT service environment. The invention does not identify any one computer as a client or server and the invention executes the same on all computers. Thus, all computers on the network are considered peer from the perspective of the invention.

Referring now to FIG. 3 there is shown an embodiment of the current invention. FIG. 3 shows a computer network system with N computers 30, where N is any integer number. Each N computer is connected to multiple data links M, where M is any integer number and corresponds to the number of network interface cards (NICs) per computer. FIG. 3A shows a dual network system where N is equal to two and M is equal to two. Computer 10 and computer 20, each with two NICs 11–12, 21–22 are exploded views of N computers and M data links shown in FIG. 3. NICs 11–12, and 21–22 are on dual subnets with identical subnet mask addresses forming two independent but parallel subnet data links 15a, 15b. The preferred embodiment also uses Window's NT 4.0 with Service Pack 4 or later to provide software access to the data link library utility IPHLPA1.DLL. Access to the software utility provides the ability to modify how the Windows operating system performs routing.

Reference will be made to computer 10 as a sending computer and computer 20 as a receiving computer but it should be understood that all computers on the network are at the same time preferably both sending and receiving computers.

Sending computer 10 broadcasts a data message identifying itself, i.e., its IP address. A separate broadcast is sent through each NIC 11–12, to the subnets 15a–15b connected to the NICs. Receiving computer 20 receives the broadcasts through NICs 21, 22. If a computer in its receive mode fails to receive a broadcast on one NIC then a failure of that data link is declared and the computer will automatically modify its local routing table such that the IP addresses corresponding to the failed data link will be switched to the alternate data link or subnet 15a or 15b. The sending computer, in its receive mode, will have also detected that the data link has failed and will similarly modify its local routing table. The sending computer will then use the alternate data link when sending application data. The receiving computer, acting as a gateway, receives the data on the alternate data link and will automatically forward the data to its correct destination, its other NIC where the data is accepted. The automatic forwarding by the receiving computer is a result of selecting IP Forwarding in Windows NT environment.

Figure 1:
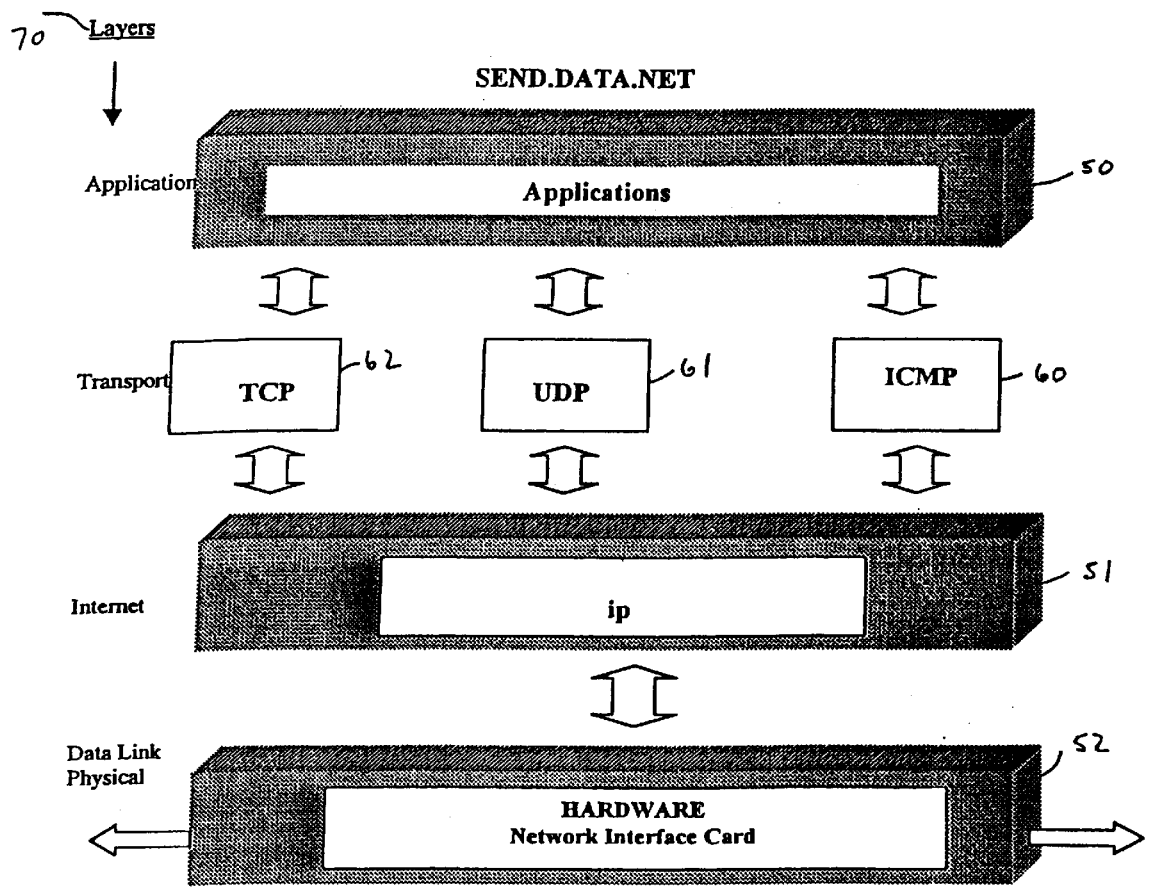
FIG. 1 is a block diagram of a typical TCP/IP layer indicating data movement from an application to or from a physical network.
Figure 2A:
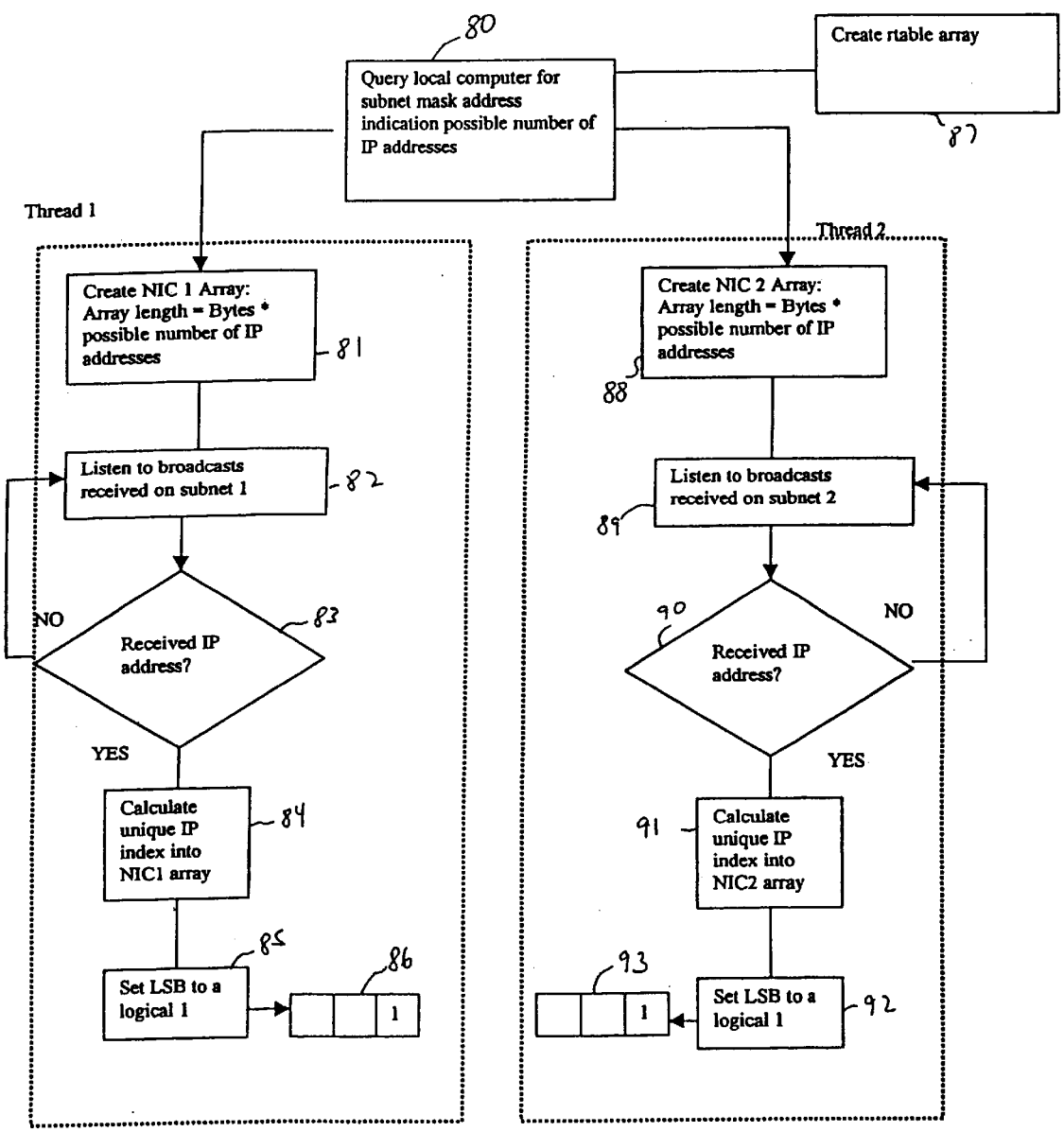
FIG. 2A is a method flow chart of threads one and two and shows the process each thread follows in listening for an IP broadcast and setting the least significant bit of a register for each IP received.

Referring now to FIG. 2A, one method used in each computer, is achieved by three software process threads and two NICs in parallel with identical subnet mask addresses. At initialization two NIC listener arrays are created as indicated by blocks 81, 88, one array for each NIC 11–12, or 21–22. The length of the arrays correspond to the number of IP addresses that are possible, i.e., one entry location or byte space per potential IP address. The listener data structure for each array is formed during initialization when the machine is queried, as indicated by block 80, for its subnet mask address. The subnet mask address directly correlates to the number of IP addresses that are possible on each subnet.

As indicated by blocks 82 and 89, each thread then listens for a broadcast on its respective subnet. When a broadcast containing an IP address is received 83,90 by a NIC, the thread process for that NIC calculates 84,91 a unique index into the corresponding NIC array for each IP address received. At the index location 86,93 the thread process sets 85,92 the least significant bit (LSB) to a logical one, thereby signifying that this IP address was received. Thus, the first two threads, one for each NIC, essentially "listen" and store a data bit for each IP address received. Later, the third process thread will periodically shift the bits and act on the results.

Figure 2B:
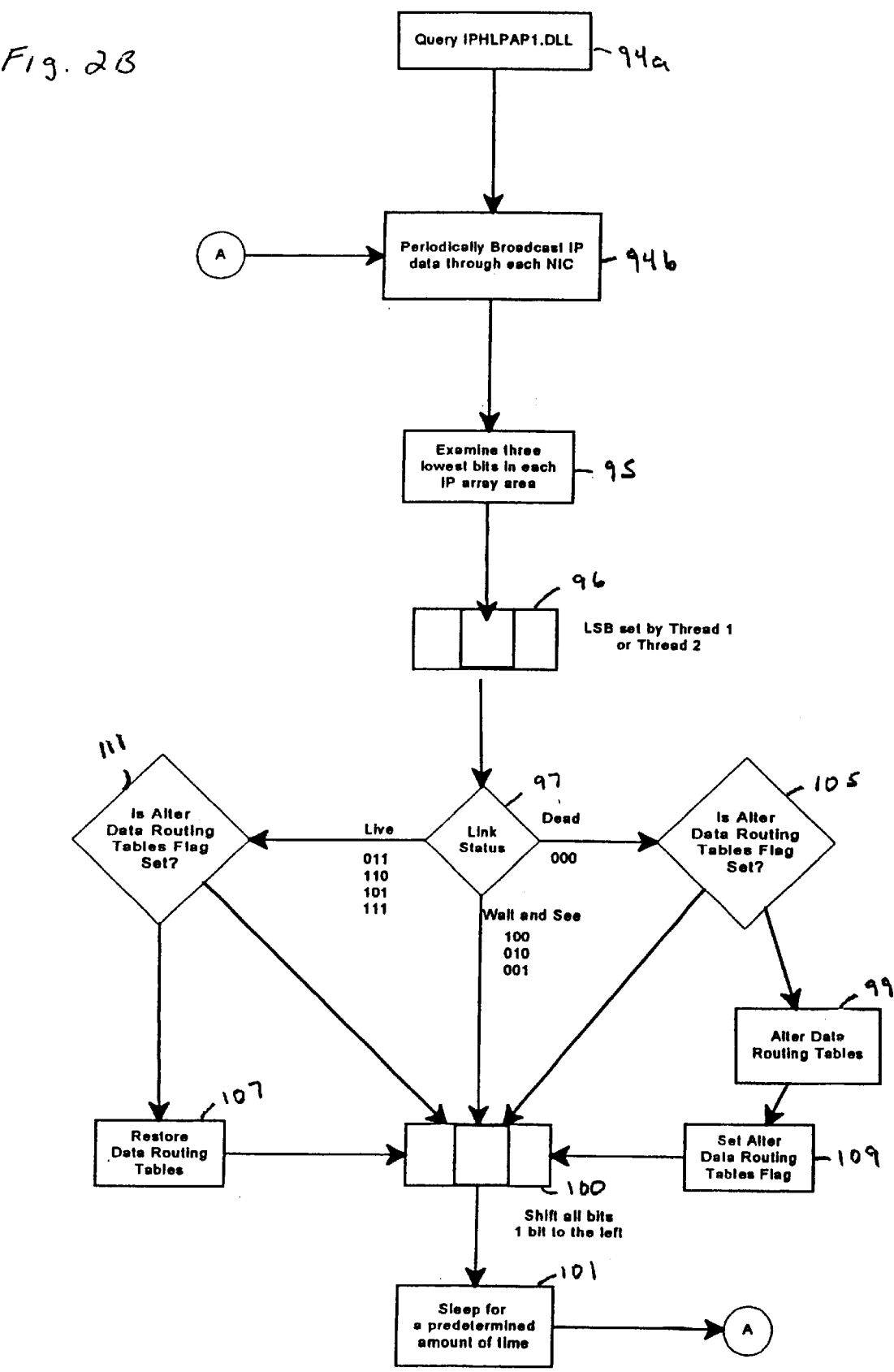
FIG. 2B is a method flow chart of thread three and shows the process the thread follows in detecting a failed subnet and altering the data routing table to reflect the failed subnet.

Referring now to FIG. 2B, the first step of the third process thread is accomplished by querying 94a the data link library utility IPHLPAPI.DLL , also part of the Windows NT environment, to determine the IP addresses of the local computer. The IP addresses returned by the library utility are then broadcasted 94b through both NICs on both subnets to other listening computers.

The third process thread's next step is to check the results of its own local listening threads. This is accomplished by examining 95 the three lowest order or LSBs in each byte area for each IP address in the NIC arrays 96. If a logical one is detected in at least two of the LSBs then the IP and its corresponding subnet are considered active 97 or live. The next step 111 after determining the subnet is live determines if the data routing tables have been altered due to the now live subnet being previously unavailable. If so, the data routing tables are restored 107 and the bits in the three lowest order LSBs are all shifted one bit to the left and the thread is repeated after sleeping 101 for a predetermined amount of time. If the determination 97 that all three LSBs are each a logical zero then the corresponding subnet is declared to be inactive and the data routing table is altered 99 after which the alter data routing table flag is set 109. If the corresponding subnet is still unavailable on the subsequent cycle the set flag is detected 105 and the bits in the three lowest order LSBs are all shifted 100 one bit to the left and the thread is repeated after sleeping 101 for a predetermined amount of time.

If the corresponding subnet is not determined 97 to be live or dead the remaining states are considered 97 inconclusive and constitute a wait and see state and the bits in the three lowest order LSBs are all shifted 100 one bit to the left and the thread is again repeated after sleeping 101 for a predetermined amount of time.

An rtable array 87 or data routing table created at initialization contains state information for each IP address as follows: 0=normal, 1=IP on NIC 1 has been redirected via NIC 2, and 2=IP on NIC 2 has been redirected via NIC 1. Thus, for each possible IP address on the subnet, action is taken as indicated in table 1. * table entries represent no change.

TABLE 1

| rtable | NIC 1 | NIC 2 | Action to Take | NEW rtable Value |
|---|---|---|---|---|
| 0 | dead | active | Reroute this IP through its counterpart on subnet 2 | 1 |
| 0 | active | dead | Reroute this IP through its counterpart on subnet 1 | 2 |
| 1 | active | * | Remove routing changes. This IP is functioning again. | 0 |
| 1 | dead | dead | Remove routing changes. This IP is no longer available | 0 |
| 2 | * | active | Remove routing changes. This IP is functioning again. | 0 |
| 2 | dead | dead | Remove routing changes. This IP is no longer available | 0 |

The last action by the third process before it sleeps is the logical shift left of the data bits in the NIC arrays for each IP address index 100. This action provides the IP address connection a lifetime status indication. For example, the lifetime of an IP address and its corresponding connection is three times the time-out period.

Finally, as noted above, the third process thread sleeps for a pre-configured amount of time 101. A small time-out period will result in transparent data link failures, but higher bandwidth requirements. If set to a larger time-out period a network failure may be less transparent while the data link is reestablished through the alternate data path.

In summary, the third process thread, through a series of steps, periodically sends broadcasts out through each NIC; examines the information recorded by the two listener threads; makes any required adjustments to the routing tables; pauses for a configurable amount of time; and then repeats the process. Thus, it is readily appreciated that the invention provides a high reliability network infrastructure in a peer-to-peer environment.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for providing data links between a sending computer and a receiving computer, said method comprising the steps of:

periodically receiving broadcasted data through a first subnet data link and through a second subnet data link, wherein reception of the broadcasted data on the subnets indicates status of the respective subnets; and changing local routing tables in the sending computer and the receiving computer based upon the status of at least one of the subnets;

wherein the step of receiving the broadcasted data further comprises:

examining the broadcast data received on the first sutnet;

storing a least significant bit (LSB) of broadcast data in a three bit register;

periodically shifting the LSB in each three bit register to provide a first time position, a second time position, and a third time position;

declaring the first subnet as active when at least two of the three time positions in the three bit register contain a logical one; and declaring the first subnet as inactive when the three positions in the three bit register contain a logical zero.

2. A method according to claim 1 wherein the step of periodically receiving the broadcast data through a first subnet data link further comprises:

receiving the broadcasted data through a first network interface card (NIC).

3. A method according to claim 1 wherein the step of periodically receiving the broadcast data through a second subnet data link further comprises:

receiving the broadcasted data through a second NIC.

4. A method according to claim 1 wherein the step of changing the local routing tables in the sending computer and the receiving computer further comprises:

dynamically changing routing tables to reroute data to the second subnet data link.

5. A method for providing alternate date paths between a first and second computer, the alternate data paths having a first and second data path, the method comprising the steps of:

sending a first data package from the first computer on the first data path;

sending a second data package from the first computer on the second data path;

receiving the first data at the second computer on the first data path;

receiving the second data at the second computer on the second data path;

detecting an inactive first data path or an inactive second data path; and reconfiguring routing tables in the first computer and the second computer when an inactive data path is detected;

wherein the step of detecting an inactive first data path further comprises the steps of:

setting a least significant bit of a first 3-bit register to a logical one when receiving the first data;

shifting the contents of the least significant bit (LSB) position of the 3-bit register one bit to the left at a pre-configured rate;

examining the 3-bit register for a logical one in at least two positions of the 3-bit register; and declaring a physical failure of the data path corresponding to the first data if the three positions of the 3-bit register are a logical zero.

6. A method according to claim 5 wherein the step of sending data from the first computer on the first data path further comprises the step of broadcasting data on the first data path through a first network interface card (NIC).

7. A method according to claim 5 wherein the step of sending data from the first computer on the second data path further comprises the step of broadcasting data on the second data path through a second NIC.

8. A method according to claim 5 wherein the step of receiving data at the second computer from the first computer on the first data path further comprises the step of receiving data through a third network interface card (NIC) on the first data path.

9. A Method according to claim 5 wherein the step of receiving data at the second computer from the first computer on the second data path further comprises the step of receiving data through a fourth network interface card (NIC) on the second data path.

10. A method according to claim 5 wherein the step of detecting an inactive second data path further comprises the steps of:

setting a least significant bit of a second 3-bit register to a logical one when receiving the second data;

shifting the contents of the least significant bit (LSB) position of the second 3-bit register one bit to the left at a pre-configured rate;

examining the second 3-bit register for a logical one in at least two positions of the second 3-bit register; and declaring a physical failure of the data path corresponding to the second data if the three positions of the second 3-bit register are a logical zero.

11. A method according to claim 5 wherein the step of reconfiguring routing tables in the first computer and the second computer further comprises:

rerouting an Internet Protocol (IP) address through the first data path when the second data path is determined to be inactive;

rerouting an IP address through the second data path when the first data path is determined to be inactive; and removing routing changes when an inactive path is restored.

12. A system for providing data paths between computers comprising:

a sending computer with a data routing table, a first network interface card (NIC), and a second NIC;

a receiving computer with a third NIC and a fourth NIC;

a first data path connected between the first NIC and the third NIC;

a second data path connected between the second NIC and the fourth NIC;

means for detecting a failure on the first data path;

means for switching from the first data path to the second data path upon detection of the failure of the first data path;

a three bit register wherein a least significant bit (LSB) is set to one for a received broadcast;

the three bit register wherein the LSB in the least significant position of the three bit register is shifted one bit to the left;

the three bit register wherein the three bit register is examined for a logical one in any two of the three bit positions; and the three bit register whererin the three bit register is examined for a logical zero in all three of the three bit positions.

13. A system as in claim 12 wherein:

the sending computer and the receiving computer each comprise a Windows NT operating system and a NT 4.0 service pack.

14. A system as in claim 12 wherein:

each NIC comprises an unique hardware address; and each NIC Comprises identical network submasks.

15. A system as in claim 12 further comprising:

a three bit register wherein a least significant bit (LSB) is set to one for a received broadcast;

the three bit register wherein the LSB in the least significant position of the three bit register is shifted one bit to the left;

the three bit register wherein the three bit register is examined for a logical one in any two of the three hit positions; and the three bit register wherein the three bit register is examined for a logical zero in all three of the three bit positions.

16. A program storage device readable by a machine, tangibly embodying a program of instructions executable by the machine to perform method steps for providing alternate sending data paths between a first and second computer, the first and second computer comprising a peer-to-peer environment, the alternate sending data paths having a first and second data path, the method comprising the steps of:

sending a first data package from the first computer on the first data path;

sending a second data package from the first computer on the second data path;

receiving the first data at the second computer on the first data path;

receiving the second data at the second computer on the second data path;

detecting an inactive first data path or an inactive second data path; and reconfiguring routing tables in the first computer and the second computer when an inactive data path is detected;

wherein the step of detecting an inactive first data path further comprises the steps of:

setting a least significant bit of a first 3-bit register to a logical one when receiving the first data;

shifting the contents of the least significant bit (LSB) position of the 3-bit register one bit to the left at a pre-configured rate;

examining the 3-bit register for a logical one in at least two position of the 3-bit register; and declaring a physical failure of the data path corresponding to the first data it the three position of the 3-bit register are a logical zero.

17. A method for providing alternate data paths between a first and second computer, the alternate data paths having a first and second data path, the method comprising the steps of:

sending a first data package from the first computer on the first data path;

sending a second data package from the first computer on the second data path;

receiving the first data at the second computer on the first data path;

receiving the second data at the second computer on the second data path;

detecting an inactive first data path or an inactive second data path; and reconfiguring routing tables in the first computer and the second computer when an inactive data path is detected;

wherein the step of detecting an inactive second data path further comprises the steps of:

setting a least significant bit of a second 3-bit register to a logical one when receiving the second data;

shifting the contents of the least significant bit (LSB) position of the second 3-bit register one bit to the left at a pre-configured rate;

examining the second 3-bit register for a logical one in at least two positions of the second 3-bit register; and declaring a physical failure of the data path corresponding to the second data if the three positions of the second 3-bit register are a logical zero.

18. A method according to claim 17 wherein the step of sending data from the first computer on the first data path further comprises the step of broadcasting data on the first data path through a first network interface card (NIC).

19. A method according to claim 17 wherein the step of sending data from the first computer on the second data path further comprises the step of broadcasting data on the second data path through a second NIC.

20. A method according to claim 17 wherein the step of receiving data at the second computer from the first computer on the first data path further comprises the step of receiving data through a third network interface card (NIC) on the first data path.

21. A method according to claim 17 wherein the step of receiving data at the second computer from the first computer on the second data path further comprises the step of receiving data through a fourth network interface card (NIC) on the second data path.

22. A method according to claim 17 wherein the step of reconfiguring routing tables in the first computer and the second computer further comprises:

rerouting an Internet Protocol (IP) address through the first data path when the second data path is determined to be inactivate;

rerouting an IP address through the second data path when the first data path is determined to be inactive; and removing routing changes when an inactive path is restored.

23. A program storage device readable by a machine, tangibly embodying a program of instructions executable by the machine to perform method steps for providing alternate sending data paths between a first and second computer, the first and second computer comprising a peer-to-peer environment, the alternate sending data paths having a first and second data path, the method comprising the steps of:

sending a first data package from the first computer on the first data path;

sending a second data package from the first computer on the second data path;

receiving the first data at the second computer on the first data path;

receiving the second data at the second computer on the second data path;

detecting an inactive first data path or an inactive second data path; and reconfiguring routing tables in the first computer and the second computer when an inactive data path is detected;

wherein the step of detecting an inactive second data path further comprises the steps of:

setting a least significant bit of a second 3-bit register to a logical one when receiving the second data;

shifting the contents of the least significant bit (LSB) position of the second 3-bit register one bit to the left at a pre-configured rate;

examining the second 3-bit register for a logical one in at least two positions of the second 3-bit register; and declaring a physical failure of the data path corresponding to the second data if the three positions of the second 3-bit register are a logical zero.

* * * * *